United States Patent [19]

Ahlstone

[11] 4,444,421
[45] Apr. 24, 1984

[54] DRIVEABLE PILE CONNECTIONS

[75] Inventor: Arthur G. Ahlstone, Ventura, Calif.

[73] Assignee: Varco International, Inc., Orange, Calif.

[21] Appl. No.: 206,015

[22] Filed: Nov. 12, 1980

[51] Int. Cl.³ .............................................. F16L 15/00
[52] U.S. Cl. ...................................... 285/86; 285/93; 285/334; 285/355
[58] Field of Search ................ 285/334, 92, 333, 390, 285/355, 93, 86; 33/168 R, 174 H; 403/343; 405/251, 228

[56] References Cited

U.S. PATENT DOCUMENTS

| 1,141,151 | 6/1915 | Speller | 285/333 X |
|---|---|---|---|
| 1,942,518 | 1/1934 | Protin | 285/93 X |
| 2,407,552 | 9/1946 | Hoesel | 285/355 |
| 2,885,225 | 5/1959 | Rollins | 285/334 X |
| 3,139,293 | 6/1964 | Franck | 285/93 X |
| 3,233,921 | 2/1966 | Holmgren et al. | 285/86 |
| 3,287,813 | 11/1966 | Lennon et al. | 33/168 R |
| 3,388,752 | 6/1968 | Hanes et al. | |
| 3,395,934 | 8/1968 | Rosan et al. | 285/92 X |
| 3,442,536 | 5/1969 | Fowler | 285/27 |
| 3,468,563 | 9/1969 | Duret | 285/334 X |
| 4,074,912 | 2/1978 | Van Bilderbeek et al. | 285/86 X |
| 4,094,539 | 6/1978 | Reimert | 285/309 |
| 4,124,229 | 11/1978 | Ahlstone | 285/391 X |
| 4,127,927 | 12/1978 | Hauk et al. | 285/93 X |
| 4,154,466 | 5/1979 | Simmons | 285/93 X |
| 4,384,737 | 5/1983 | Reusser | 285/334 |

FOREIGN PATENT DOCUMENTS

| 460381 | 5/1928 | Fed. Rep. of Germany | 285/390 |
|---|---|---|---|
| 806400 | 9/1936 | France | 285/390 |
| 51682 | 3/1943 | France | 285/355 |
| 1600610 | 10/1981 | United Kingdom | |

OTHER PUBLICATIONS

"Machinery Handbook", 15th Edition, 3rd Printing, Copyright 1956, pp. 991–1003, 1008–1013, 1016, 1017, 1026, 1027, 1208, 1209, 1164 & 1165.

"National Casing Tubing and Drill Pipe", published by United States Steel, Dec. 1964, pp. 19, 22 and 99.

Primary Examiner—Thomas F. Callaghan
Attorney, Agent, or Firm—William P. Green

[57] ABSTRACT

Connections for attaching together successive sections of an axially driveable pile, including pin and box ends having engaging threads which are tapered and which as viewed in axial section have opposite side faces both disposed at a very small angle of not over about 5.5 degrees with respect to a line extending perpendicular to and intersecting the axis of the threaded connection, preferably between about 4.5 and 5.5 degrees, so that the threads can take very high axial driving and rebounding forces. Each thread desirably has an axial thickness at its pitch line at least about one and one-half times the height of the thread from its root to its crest. The pin and box elements preferably do not have shoulders engageable to limit the extent to which the parts can be screwed together in the fully made-up condition of the joint. A locking ring or rings may be carried about one of the threaded sections and have lugs receivable within notches formed in the two sections to lock them against relative rotation in the made-up condition of the joint.

13 Claims, 15 Drawing Figures

DRIVEABLE PILE CONNECTIONS

BACKGROUND OF THE INVENTION

This invention relates to improved threaded connections for attaching together successive sections of an axially driveable pile or other similar driveable structure.

During the installation of an off-shore well drilling platform, it is customary to drive into the ocean floor a number of piles which function to connect the platform to the earth formation and locate and retain the platform in fixed position while transferring platform loads and forces to the soil Each pile is formed of a series of large diameter pipe sections connected together in end to end relation either by welding or by a specially formed mechanical connector. Since very heavy forces must be transmitted axially through such a pile as it is driven into the earth, the connections formed between successive sections of the pile must be of a character to withstand those heavy forces without adverse effect, and to maintain the integrity of the overall pile structure at all times.

Most of the mechanical pile connectors which have heretofore been devised have had very severe limitations in one or more respects, and as a result have not been used as widely as would be desired. Instead, welded joints continue to be utilized in the large majority of marine installations, even though welding requires a great deal of time to make a connection, and does not permit easy subsequent disconnection of the parts for removal and re-use.

One type of mechanical connector which has been devised incorporates a breech block structure in which the two parts are provided with circularly discontinuous thread-like teeth which are movable into and out of connected relation by relative rotation of the parts through a small angle. Such connectors unfortunately require extremely careful alignment of the pin and box members in order to move them into positions in which they can be joined by the limited relative rotation, and even after the connection is completed the joint does not provide a rigid connection between the parts and necessarily permits some slight relative movement between the pin and box members as a result of machining and assembly tolerances. That looseness between the pile sections can rapidly damage the connected elements under the loads imparted to the pile when struck by a hammer, and under the reverse rebounding loads to which the connection is subjected in the opposite direction. The connection is also relatively expensive to manufacture.

Another type of pile connector currently on the market employs a number of locking dogs which are carried by one pile section and are engageable with teeth formed on the other pile section in a camming relation intended to lock the two parts in rigidly fixed condition. This type of connector, however, is very difficult and expensive to manufacture, requiring the fabrication and handling of a large number of parts having very close tolerances and can break or release under the load forces encountered in use.

There have also been prior connectors which were intended to be driveable and which have included two parts attached together by interengaging threads. These joints have not, however, been capable of withstanding the pounding and rebounding forces to which a pile is subjected, and have tended to develop looseness in the joint causing its ultimate destruction. Additional driveable connectors devised in the past have employed interference fits of various types.

During the installation of an off-shore drilling platform, it is extremely important that the time period required for the overall installation procedure be kept to an absolute minimum. The equipment 'spread' utilized for such platform installation, including derrick barges, tugboats, supply barges, etc., involves a very high daily cost, with rates of fifty-thousand dollars to five-hundred thousand dollars per day depending on location in the world and availability. In addition, this equipment can only work off-shore when the sea state is below a certain level. In some areas of the world this 'weather window' or time of calm weather can be very short. The time required to properly set a platform, and the weather windows available at the site, are very carefully studied, and every possibility of reducing the time expended is explored. Since welding of a large size pile joint normally takes between eight and twenty-four hours, use of a connector which could do the job in minutes would greatly reduce the overall cost of installation of the platform and facilitate completion of the job within a limited weather window. It has also been found that piles can attain deeper and faster penetration if the delay encountered during addition of a joint to the string is minimized.

The major purpose of the present invention is to provide a mechanical connection which can be utilized for attaching together successive sections of a pile or other axially driveable structure, and which makes a very rigid and permanently reliable connection between successive sections but does it more rapidly than by welding and more rapidly and effectively than by prior mechanical connectors devised for the same use. In addition to these advantages, a connection embodying the invention is structurally simpler and less expensive to manufacture than most previously devised driveable connectors with which I am familiar, and is more easily manipulated to make or break a joint.

A connection formed in accordance with the invention includes pin and box sections having engaging threads which are preferably of a unique type enabling transmission directly through the threads themselves of substantially all of the axial driving and rebounding forces to which the pile is subjected. In the previously proposed types of driveable connectors which have used threaded joints, the threads have not proven capable of taking such heavy forces, and as a result the pin and box sections are usually provided with transverse annular shoulders which abut against each other in the fully made-up condition of the joint to transmit axial forces through those shoulders. The area of engagement of these annular shoulders is however so limited that the shoulders tend to deform slightly and develop looseness under the driving forces, and in addition the shoulders of course can not assist at all in absorbing the reverse or rebounding forces which follow each impact of the driving hammer. Further, the shape of the threads has been such as to cause a camming action between the threads of the two parts inducing hoop stresses in the box member expanding it radially outwardly relative to the pin and thus further detracting from the strength and integrity of the joint.

To maximize the effectiveness with which both driving and rebounding forces are taken by the threads of the present invention, those threads are of a novel configuration having an overall axial taper in conjunction with an axial sectional thread form or shape in which the opposite side faces of the thread converge toward one another as they advance radially outwardly, but do so at a very small angle, and with each of those faces being disposed at an angle nearly but not quite perpendicular to the axis of the joint. More specifically, each of those opposite side faces of the thread as viewed in axial section should preferably be disposed at an angle of not more than about 5.5 degrees with respect to a line extending directly perpendicular to the axis of the threads, and desirably between about 4.5 and 5.5 degrees respect to that line. Each thread as viewed in axial section should also have a thickness between those opposite side faces and at the pitch line which is greater than the height of the thread between its root and crest, and preferably at least about one and one-half times that height.

At its crest, each thread should have a surface of substantial axial extent which tapers in accordance with the overall taper of the thread, and which preferably has a length in a direction parallel to the pitch line which is greater than the height of the thread perpendicular to that line. The threads are thus thicker axially than most threads to give them the strength required for taking axial forces, and have opposite side faces disposed sufficiently close to a directly transverse condition to take the axial forces in both directions directly through the threads without any substantial camming action tending to develop an excessive hoop stress in the box member or an excessive constricting force in the pin section.

The overall area defined by the engaging opposite side faces of these threads is much greater than can be attained in a conventional annular shoulder type engagement, and thus the joint as a whole can take axial forces in both directions very effectively. The joint is also rendered self-locking by the very slight angularity of the thread faces with respect to a line perpendicular to the axis of the joint, and by giving the thread a very small helix angle. This self-locking characteristic may be enhanced by forming the thread surfaces of a material having a relatively high coefficient of friction. Additionally, the taper of the threads in conjunction with their above discussed cross-sectional configuration and helix angle enables the pin and box to be stabbed together very easily without precision pre-aligning of the parts. The taper further supplements the self-locking characteristics of the joint when made up tightly to a predetermined torque, forcing the opposite side faces into tight engagement frictionally resisting unscrewing of the joint even under the heavy pounding forces which are encountered in driving of a pile Other features of the invention relate to the provision of a unique type of positive locking system for mechanically preventing relative rotation of two threadedly connected parts from a predetermined fully made-up condition. To attain such a locking action, I may employ a locking element which is carried about one of the two threadedly interconnected sections, and is desirably retained thereon by extension more than half way about the part, preferably substantially entirely thereabout. This locking element has lugs which are receivable within notches formed in both of the two threaded sections to interconnect the sections against relative rotation. The locking element or ring may be movable relative to the section about which it is carried from a locking position to an inactive or retracted position in which it does not prevent relative rotation of the threaded parts. Fasteners may be provided for retaining the locking element in its active locking position.

BRIEF DESCRIPTION OF THE DRAWINGS

The above and other features and objects of the invention will be better understood from the following detailed description of the typical embodiments illustrated in the accompanying drawings in which.

DESCRIPTION OF THE PREFERRED EMBODIMENTS

Figures 1, 2:
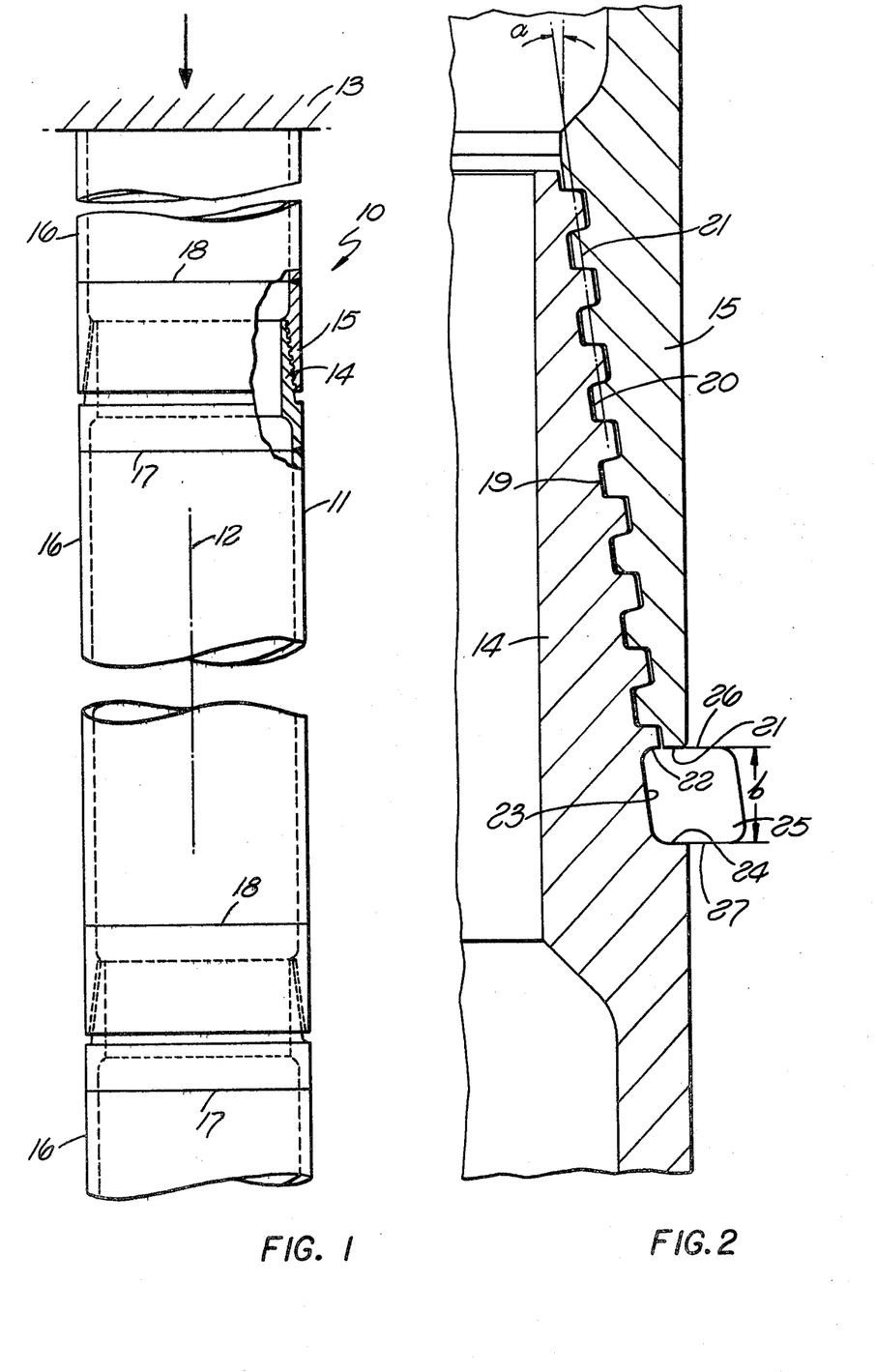
FIG. 1 is a side elevational view, partially broken away in axial section, showing a portion of a pile formed in accordance with the invention.
FIG. 2 is an enlarged axial section through the threads of two of the interconnected successive sections of the pile structure of FIG. 1.

The pile assembly 10 illustrated somewhat diagrammatically in FIG. 1 includes a series of typically identical pile sections 11 each taking the form of a large diameter pipe centered about the longitudinal axis 12 of the overall pile assembly. Downward axial forces may be applied to the upper end of the pile by the pile driving hammer represented diagrammatically at 13, to drive the pile progressively more deeply into the earth formation beneath an ocean or other body of water, or at any other location at which it may be desired to locate the pile. Each section 11 has an externally threaded pin end 14 and an internally threaded box end 15. It is contemplated that if desired the pin and box ends of each pile section may be formed integrally with the intermediate main body of the section, or may be formed separately as joint ends welded to a main body 16 at annular weld lines 17 and 18.

As seen in FIG. 2, the external thread 19 of each pin 14 and the internal thread 20 of each box 15 are of corresponding tapered configuration, with their pitch line 21 being disposed at an angle a with respect to the axis 12 of the threads. In the presently preferred arrangement, this angle of taper a is desirably between about 6 degrees and 9 degrees, and for best results is approximately 7.5 degrees.

Pin and box sections 14 and 15 do not have transverse annular stop shoulders which engage to limit threaded interconnection of the parts in a fully made-up condition. Instead, the threads themselves offer the only resistance to interconnection of the parts, and transfer all load forces in the FIG. 2 fully made-up condition. To indicate when that condition is attained, box end 15 has an annular end surface 21 disposed transversely of axis 12 and which in the fully made-up condition is directly aligned with and flush with a transverse annular shoulder 22 formed on pin section 14 and also disposed directly transversely of axis 12. In making-up the joint, an operator turns the upper section relative to the lower one by appropriate power equipment until the two shoulders 21 and 22 are in alignment, with that alignment indicating that the connection has been completed to a proper torque.

Figure 3:
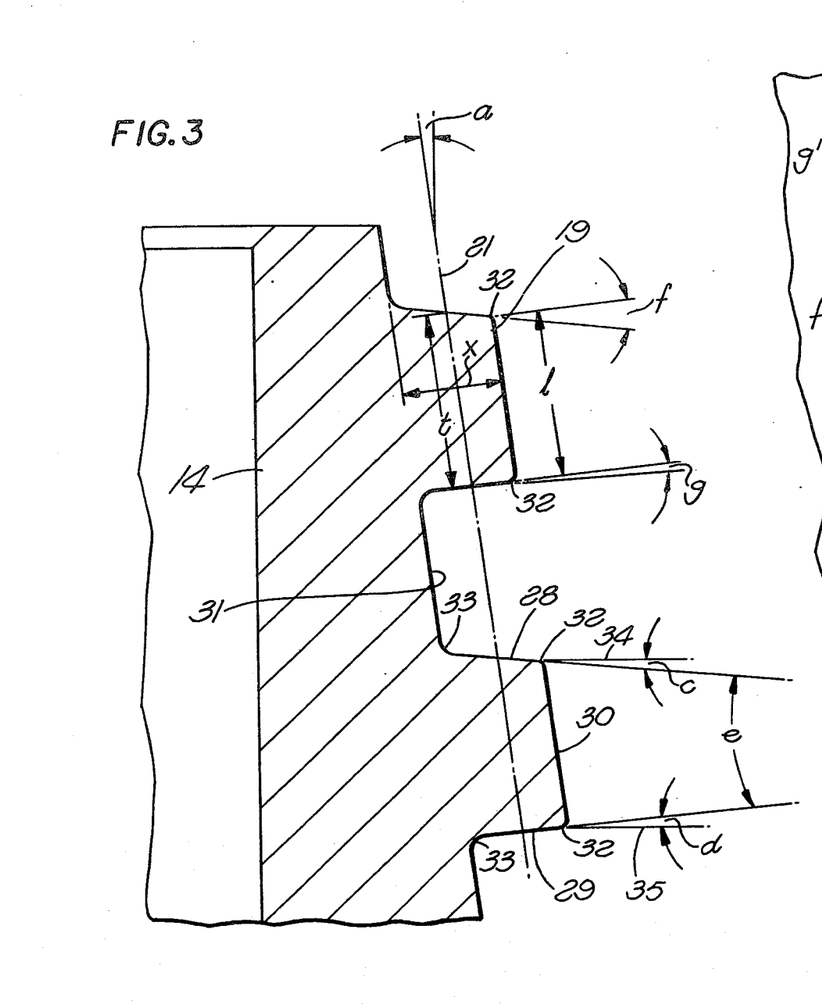
FIGS. 3 and 4 are greatly enlarged fragmentary axial sectional views through the end portions of the pin and box threads respectively of the FIG. 1 and 2 connection.

The shoulder 22 formed in pin end 14 may define one side of an annular groove 23 formed in the exterior of the pin, with that groove having a second annular side wall surface 24 at its opposite side extending transversely of axis 12 and received axially opposite the end surface 21 of the box. The spaced relationship between box and pin surfaces 21 and 24 may then be employed as a further or alternate indication of attainment of a proper make-up torque between the two joint ends, with that correct fully made-up condition being achieved when the spacing between shoulders 21 and 24 is the dimension represented at b in FIG. 2. A go-no go gauge part 25 having this axial dimension b between its parallel opposite side surfaces 26 and 27 may be provided, so that by insertion of gauge 24 within groove 23 an operator can tell whether the parts have been connected together far enough. If the gauge is exactly receivable within the spacing between shoulders 22 and 24, or can not be received within that space, at least the desired proper torque has been attained FIG. 3 shows in greatly enlarged form the configuration of the external thread 19 of pin 14 as viewed in axial cross-section, that is, in a plane containing main axis 12 of the joint. The thread is desirably of uniform cross-section along its entire helical extent, being defined primarily by two opposite side faces 28 and 29 and an axially outer crest surface 30, with a root surface 31 extending between successive turns of the thread. Rounded corners 32 may be formed on the thread at the juncture of crest surface 30 and the opposite side surfaces 28 and 29. These corners are rounded relatively abruptly, that is, at a relatively small radius of curvature, say for example 0.050 inches radius Rounded fillet surfaces 33 may be formed at the juncture of root surface 31 with the two opposite side surfaces 28 and 29 of successive turns of the thread. These fillet surfaces are preferably curved less abruptly than the corners 32, that is, at a greater radius of curvature, say for example 0.100 inches radius.

Crest surface 30 and root surface 31 of the thread, as viewed in axial section, both converge progressively toward axis 12 of the threads as they advance upwardly. Desirably, each of these surfaces appears as a substantially straight line as viewed in axial section (FIG. 3) and is parallel to the pitch line 21 of the thread. Surfaces 30 and 31 thus taper conically with respect to axis 12.

The upper or axially outer side surface of thread 28 as seen in FIG. 3 advances gradually downwardly as it advances radially outwardly, at a small angle c with respect to a line 34 extending directly perpendicular to and intersecting axis 12. Similarly, the bottom side surface or axially inner surface 29 of the thread advances gradually upwardly or axially outwardly as it advances radially outwardly, at a small angle d with respect to a line 35 extending directly perpendicular to and intersecting axis 12. Each of the angles c and d should be not more than about 5.5 degrees, preferably between about 4.5 and 5.5 degrees, and optimally substantially exactly 5 degrees. Also, the included angle e between the two side surfaces 28 and 29 of a particular turn of thread 19 of the pin section should preferably be not greater than about 11 degrees, desirably between about 9 and 11 degrees, and optimally substantially exactly 10 degrees.

The helix angle of the thread, that is, the angle which measures the rate of axial advancement of the thread with respect to its circumferential advancement (at the pitch line) should also be very small, preferably not over about 1°, in most instances between about 0° 30′ to 0° 52′, and ideally between 0° 35′ and 0° 46′. This angle because of its small size can not be represented in the drawing.

Figure 4:
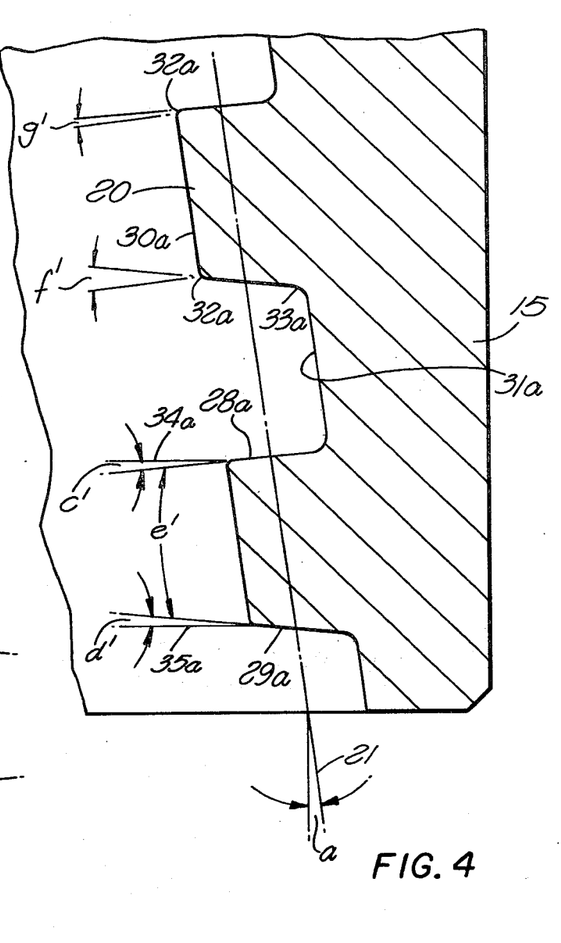

As seen in FIG. 4, the axial sectional configuration of thread 20 of box member 15 is very similar to the discussed configuration of the pin thread of FIG. 3, having opposite side surfaces 28a and 29a, crest and root surfaces 30a and 31a, corners 32a rounded at a relatively abrupt radius of curvature the same as corners 32 of the pin threads, and fillet surfaces 33a rounded at a less abrupt radius of curvature corresponding to surfaces 33 of the pin thread. The crest and root surfaces 30a and 31a taper conically at the same angle of taper a as pitch line 21 and the crest and root surfaces of the pin.

Surface 28a of the box thread advances gradually downwardly as it advances radially inwardly, at an angle c′ with respect to line 34a perpendicular to and intersecting axis 12, while the opposite side surface 29a of the box thread advances gradually upwardly as it extends radially inwardly toward the crest of the thread and at an angle d′ with respect to line 35a perpendicular to and intersecting axis 12. The two surfaces 28a and 29a converge at an included angle e′. As with the corresponding angles of the pin thread, angles c′ and d′ should be not greater than about 5.5 degrees, preferably between 4.5 and 5.5 degrees, and optimally substantially exactly 5 degrees, while the included angle e′ should be between about 9 and 11 degrees, and preferably 10 degrees.

It is also noted that, with regard to each of the threads 19 and 20, the two side faces 28 and 29 or 28a and 29a of that thread are disposed at different angles to the crest surface 30 or 30a of the same thread. For example, the angle f between surface 28 of thread 19 and a line perpendicular to crest surface 30 of thread 19 is different than the angle g between surface 29 and surface 30, and the same is true of the corresponding angles f′ and g′ of thread 20. Preferably, angles f and f′ are at least about three times as great as angles g and g′ respectively.

In order to attain an effective self-locking action between the engaging pin and box threads, it is desirable that the tangent of each of the angles c, d, c′ and d′, as well as the helix angle, be less than the coefficient of friction between the engaging thread faces 28 and 29a and 29 and 28a. The main bodies of pin sections 14 and 15 are normally formed of steel, and in order to increase the coefficient of friction between the defined engaging thread faces those faces may be coated with a material having a coefficient of friction higher than that of the steel of the pin and box bodies. Preferably, all of the thread surfaces, including surfaces 28, 29, 30, 31, 28a, 29a, 30a and 31a, are coated with copper, electro-plated or otherwise deposited on the steel and adhered thereto. The coefficient of friction between two such surfaces is 1.21 when the surfaces are clean and dry and 0.76 when oxidized, and the tangent of 5.5 degrees is 0.09629.

The relatively great axial thickness of the threads 19 and 20 between their opposite side surfaces 28 and 29 and 28a and 29a gives the threads sufficient strength to take the axial load forces encountered during a driving action without shearing of the threads. To define that axial thickness, it is preferred that the thickness dimension t of each turn of the thread between its opposite side faces 28 and 29 or 28a and 29a, and taken at and along the pitch line 21, be greater than the height dimension x of the thread between its crest surface 30 or 30a and its root surface 31 or 31a, taken perpendicular to the pitch line, with the dimension t preferably being at least about 1.5 times as great as the dimension x, and for best results being approximately 1.66 times the dimension x. Also, the length 1 of each crest surface 30 or 30a should be substantially greater than the dimension x, and for best results at least about 1.5 times dimension x.

In connecting the pin and box members 14 and 15 of FIGS. 1 to 4 together, the box member may be easily stabbed over and into alignment with the pin by virtue of the taper of the threads, and in particular the conical taper of crest surfaces 30 and 30a. These surfaces engage to progressively center the box relative to the pin as the parts move into axially interfitting relation. When the box and pin reach a predetermined relative position, the threads of the pin will begin to enter the grooves formed in the box thread, and vice versa, and by relative rotation the two parts can be screwed axially together and ultimately to the FIG. 2 fully made-up condition Because of the fact that the corners 32 and 32a curve more abruptly than fillets 33 and 33a, the cor- ners can not nest completely within the fillets without slight deformation of the parts, thus attaining an interfering action enhancing the self-locking characteristic of the joint The slight radial taper of the threads represented by angles c, d, etc. enables the threads to easily move into engagement with one another, and enables the opposite side surfaces 28, 29, etc. to engage progressively more tightly as the joint is made-up. The small angles c, d, etc. are not great enough, however, to cause any excessive radial camming of the threads relative to one another, or to develop any excessive hoop stress in the box tending to expand it to a distorted condition. In the fully made-up condition of FIG. 2, as determined by alignment of surfaces 21 and 22, and/or by positioning of gauge element 25 in groove 23, the very tight frictional engagement of surfaces 28 and 29 with surfaces 29a and 28a respectively frictionally locks the joint against unscrewing rotation of the parts, and forms a very rigid and tight connection between two successive sections of the pile. When hammer 13 applies a downward driving force against the pile, this force is transmitted from box thread surfaces 29a to pin thread surfaces 28 over an extended area defined by the entire helical extent of these surfaces, which is sufficient to transmit the forces without damage to the parts. When the pounding force is released, a similar rebounding force occurs in the opposite direction, which is taken by engagement of the pin thread surface 28 with box thread surface 29a, and like the driving force is spread over the entire helical extent of those surfaces to transmit the force without damage to the parts. If it is desired to disconnect the parts at any time, this may be attained by merely forcibly rotating the box relative to the pin to unscrew the threads.

Figure 5:
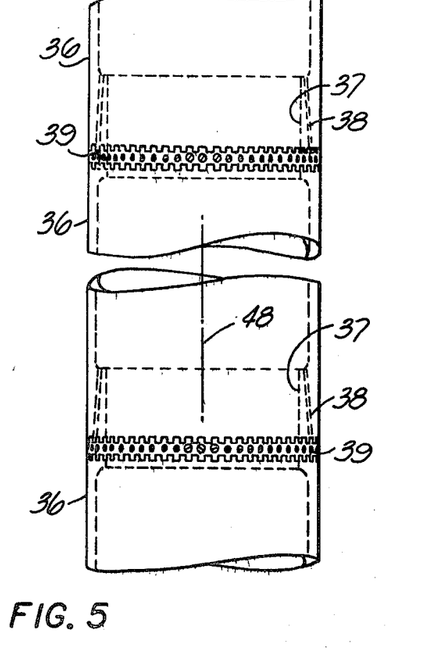
FIG. 5 is a view similar to FIG. 1, but showing a variational arrangement using a locking ring in conjunction with the threaded connection.
Figure 6:
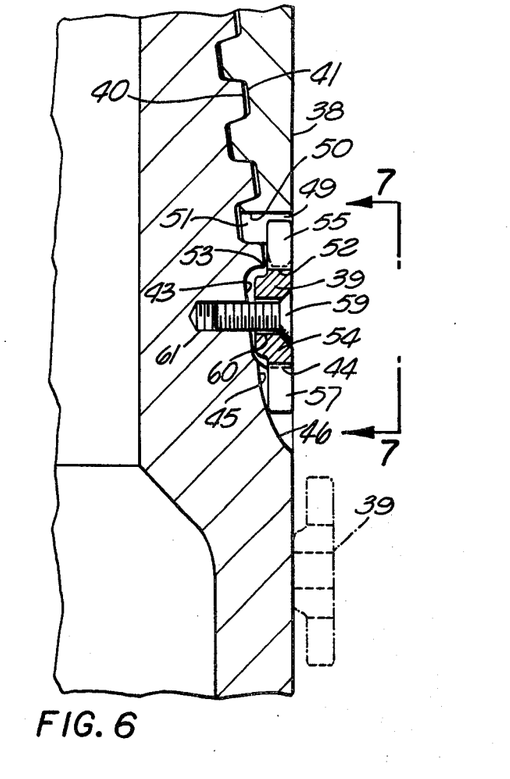
FIG. 6 is an enlarged fragmentary axial section through a portion of one of the threaded connections of FIG. 5.
Figure 7:
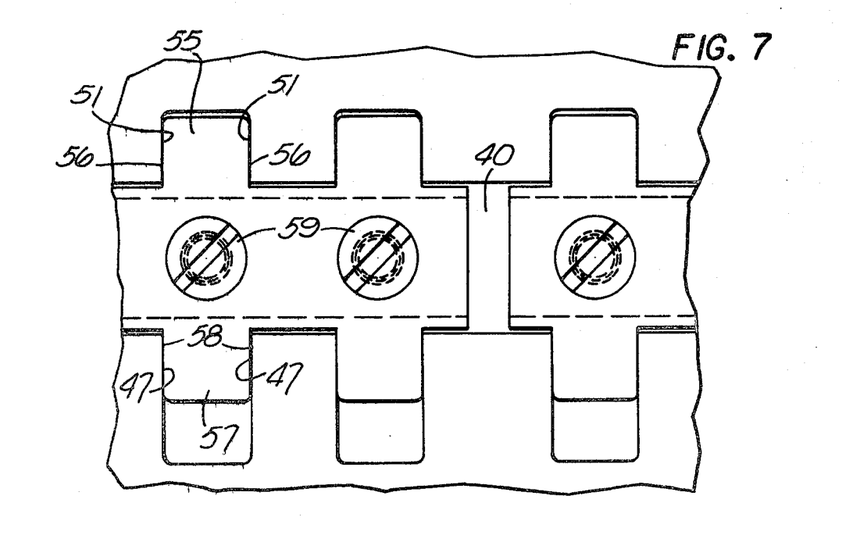
FIG. 7 is a fragmentary elevational view taken on line 7—7 of FIG. 6.

FIGS. 5 through 7 show another driveable pile constructed in accordance with the invention and including a series of pile sections 36 having pin and box ends 37 and 38 and locking rings 39 for retaining successive sections against relative rotation from their fully made-up condition. The threads 40 and 41 of the pin and box ends may be identical with the threads of FIGS. 1 to 4. Ring 39 is carried about the pin end and is movable relative thereto between the active position illustrated in full lines in FIG. 6 and the retracted position illustrated in broken lines in that figure. The ring extends entirely about the pin in the full line locking position, but is a split ring being interrupted or cut at the location 40 in FIG. 7 to enable radial expansion of the ring to an increased diameter permitting its reception about the outer surface 42 of the pin in the broken line in active position of FIG. 6. The ring may be formed of metal, typically spring steel or another appropriate steel, and tends by its resilience to return to the reduced diameter full line condition of FIG. 6. In the broken line position, the ring constricts tightly about and against surface 42 of the pin to be carried thereby and frictionally retained against axial movement relative thereto.

The annular groove 43 in the periphery of pin 37 at the lower end of its threads is the same as groove 23 of FIG. 2, except that the bottom wall 44 of the groove is interrupted at a series of circularly spaced locations to form vertically extending circularly spaced notches 45 in the pin communicating with recess 43. Each of these notches may be defined by an inner wall 46 curving gradually outwardly as it extends downwardly and two spaced parallel vertical walls 47, extending parallel to axis 48 of the pile and its threads. Above and vertically opposite the notches 45, the lower edge portion of box section 38 contains a series of notches 49, defined by top walls 50 and spaced parallel vertical walls 51 which are parallel to axis 48. Circularly between notches 49, the box section has surfaces 52 aligned with one another and disposed perpendicular to axis 48 and which are aligned or flush with transverse annular shoulder surface 53 on the pin in the fully made-up condition to indicate attainment of that condition in the same manner as discussed in connection with surfaces 21 and 22 of FIG. 2.

The locking ring 39 has a main body portion 54 of a cross-section to fit within groove 43 and extending circularly about the pin within that groove. Projecting upwardly from this main body portion 54, ring 39 has a series of circularly spaced locking lugs or projections 55, dimensioned to fit closely within notches 49 and having opposite side surfaces 56 parallel to one another and to surfaces 51 and engageable with those surfaces 51 to lock the box against rotation relative to ring 39. At its lower edge, the ring 39 carries a second series of locking lugs or projections 57 which project downwardly into and are close fits between the opposite side surfaces 47 of notches 45, and which have opposite side wall surfaces 58 engageable with surfaces 47 to lock the pin section 37 against rotation relative to ring 39. As seen in FIG. 7, the lower lugs 57 are preferably directly beneath and in vertical alignment with upper lugs 55. A number of circularly spaced screws 59 extend through openings 60 in ring 39 and connect threadedly into bores 61 in pin section 37 to rigidly hold the ring in its locking position within groove 43.

In using the device of FIGS. 5 through 7, the locking ring 39 may initially be placed in its broken line position of FIG. 6 in which it is carried about and movable with pin section 37. With the ring at that location, the box is stabbed over the pin and the two parts are connected threadedly together as discussed in connection with the first form of the invention. Arrival at the proper fully made-up condition of the joint is indicated by alignment of surfaces 52 and 53, or by positioning of a gauge element within groove 43 and between surfaces 52 and 44 in the manner discussed in connection with gauge part 25 of FIG. 2. When the joint has reached a proper fully made-up condition, pin and box parts are turned to locations corresponding to those illustrated in FIG. 7 in which the notches 49 in the box are directly vertically aligned with the notches 45 in the pin. Ring 39 is then slipped upwardly along the outside of pin 37, until it reaches a location opposite groove 43, at which time it will snap by its own resilience into that groove, with lugs 55 and 57 falling into notches 49 and 45 to effectively lock the pin and box against relative rotation in either direction. Screws 59 may then be connected through the ring into the pin to hold the locking ring in fixed position. When it is desired to disconnect the pin and box, the screws may be removed, and the ring may be slipped downwardly to the broken line position of FIG. 6.

Figure 8:
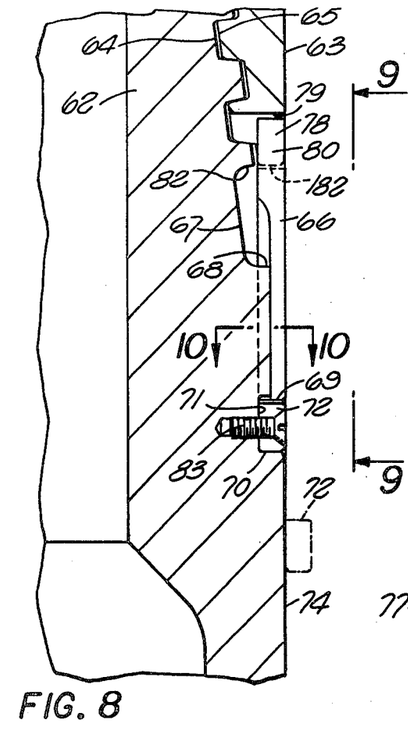
FIG. 8 is a fragmentary axial section similar to FIG. 6 but showing another variational form of the invention.
Figure 9:
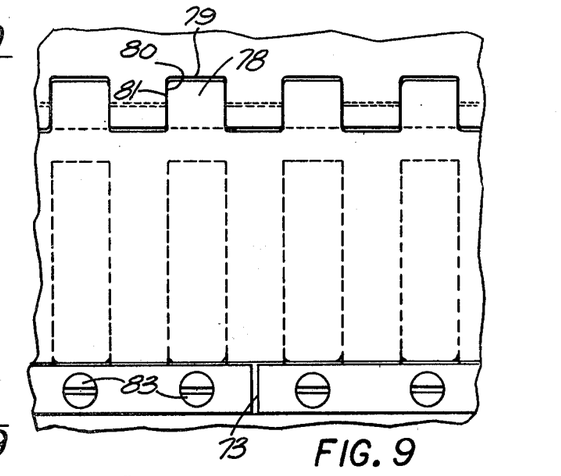
FIG. 9 is a fragmentary elevational view taken on line 9—9 of FIG. 8.

The variational form of connection shown in FIGS. 8 and 9 includes pin and box sections 62 and 63 having threads 64 and 65 identical with those of FIGS. 1 to 4 and provided with a locking ring 66 forming a function similar to ring 39 of FIGS. 5 to 7 but constructed differently. The groove 67 formed in the outer surface of the pin at the lower end of its threads may be the same as groove 23 of FIG. 2, except that bottom wall 68 of the groove is interrupted to allow extension of the locking ring downwardly as shown. The locking ring 66 in this instance is solid and completely circular and preferably formed of steel or other metal, and is movable downwardly from the locking position of FIG. 8 to a lower inactive non-locking position in which the bottom annular transverse planar surface 69 of the ring is engageable with a bottom wall surface 70 of a lower annular groove 71 formed in the periphery of the pin. In its locking position, ring 66 is retained against such downward movement by reception of a split ring 72 within lower recess 71 vertically between shoulder 70 and the bottom end surface 69 of ring 66 to block downward movement of rind 66. The split ring is substantially circular, being interrupted only at a cut or slit 73, and tends by its resilience to constrict inwardly to the reduced diameter full line condition of FIG. 8. This ring is expansible radially outwardly to an increased diameter and is then shiftable axially along the outer cylindrical surface 74 of the pin to the broken line inactive position of FIG. 8. In that position, the ring 72 constricts tightly inwardly against the outer surface of the pin to be retained and carried thereon and held against axial movement by frictional engagement between the parts.

Ring 66 is retained against rotation relative to pin 62 by reception of a number of vertically extending splines or lugs 75 formed on the radially inner side of ring 66 within mating vertical grooves 76 formed in the outer surface of the pin vertically between groove 67 and recess 71. The splines or lugs 75 and recesses 76 have axially extending parallel shoulders 77 extending vertically and radially of the threaded connection. Radially outwardly of these splines 75, ring 66 has a circularly continuous wall 166. The splines thus guide ring 66 for upward and downward movement between its active and inactive positions relative to pin 62 while positively locking the ring against rotation relative to the pin.

At its upper edge, ring 66 has a series of circularly spaced lugs 78 receivable within circularly spaced notches 79 formed in the lower end of box section 63, and having radially and vertically extending opposite side surfaces 80 engageable with axially and radially extending shoulders 81 on the box section to lock the box against rotation relative to the ring in the FIG. 8 setting of the ring.

Figure 10:
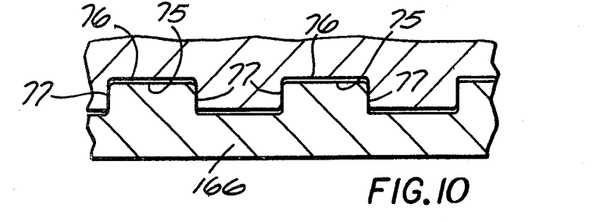
FIG. 10 is a fragmentary horizontal section taken on line 10—10 of FIG. 8.

In using the device of FIGS. 8 through 10, the threaded joint is made-up with ring 66 in its lower inactive position and with retaining ring 72 in its broken line position of FIG. 8. The fully made-up condition is indicated in the same manner previously discussed by notation of the position at which the bottom end surfaces 182 on the box are aligned transversely with shoulder surface 82 on the pin. When this condition is attained, ring 66 is slipped upwardly to its full line position of FIG. 8, in which lugs 78 are received within notches 79 to lock the parts against relative rotation, with split ring 72 then being slipped upwardly and allowed to constrict inwardly to its full line position of FIG. 8 in which it blocks and prevents downward retracting movement of ring 66 and thus holds the part in assembled condition while preventing relative rotation of the two threaded elements. Circularly spaced screws 83 then may be inserted through openings in split ring 72 and connected into opposed threaded bores in the pin to hold the split ring in its active condition.

Figure 11:
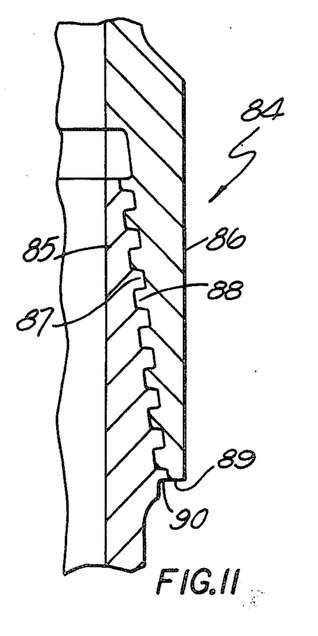
FIG. 11 is a fragmentary axial section similar to FIG. 2 but on a reduced scale and showing a variational form of threaded connection which is internally flush rather than externally flush.

The variational form of connection 84 shown in FIG. 11 includes a pin 85 and box 86 having threads 87 and 88 which may be the same as those described in connection with FIGS. 1 to 4. The FIG. 11 arrangement differs from that of FIGS. 1 to 4 in that the pin and box of FIG. 11 are internally flush rather than externally flush. The fully made-up condition of the joint of FIG. 11 is indicated by transverse alignment of an annular transverse end surface 89 on the box with a transverse annular shoulder surface 90 on the pin.

Figure 12:
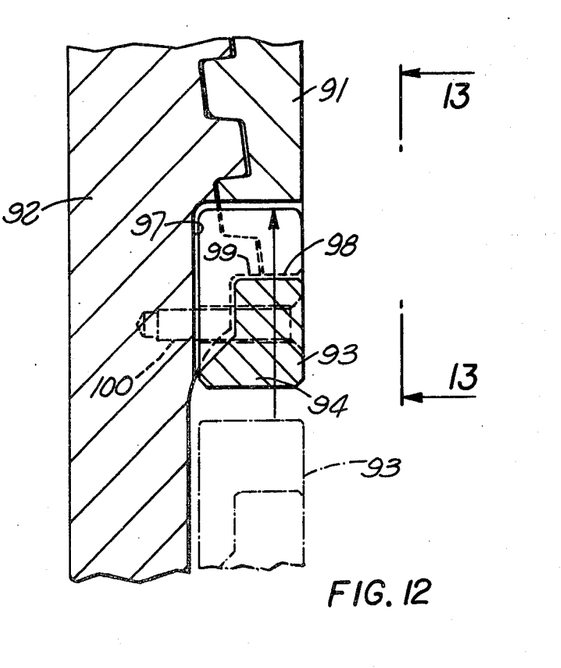
FIG. 12 is a fragmentary axial section similar to FIG. 6 and showing an internally flush connection having a locking ring.
Figure 13:
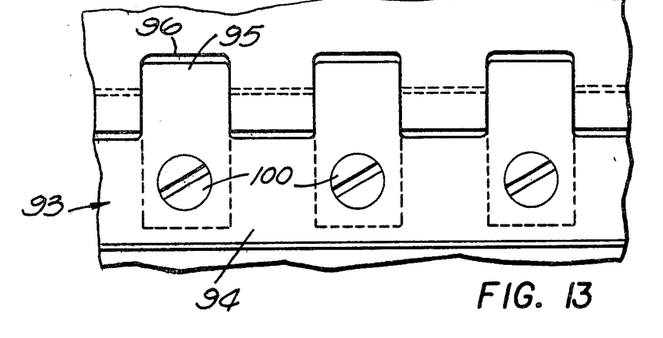
FIG. 13 is a fragmentary elevational view taken on line 13—13 of FIG. 12.

FIGS. 12 and 13 show another internally flush joint having a box 91 and pin 92 which may be identical with the box and pin of FIG. 11 except for changes made to accomodate reception of a locking ring 93 about the pin. This ring 93 has a solid circularly continuous rigid annular portion 94 of a cross-section corresponding to the hatched portion in FIG. 12, and carrying a series of circularly spaced lugs 95 which are received partially within circularly spaced notches 96 formed in the lower end of box 91 and partially within notches 97 formed in the pin at the lower end of its thread. The locking ring is movable downwardly to the broken line position of FIG. 12 in which it is carried about the pin and does not interfere with relative rotation of the pin and box. After the threads of the pin and box have been made-up to the condition of FIG. 12, as indicated by alignment of transverse surfaces 98 and 99 on the two parts, ring 93 is moved upwardly to bring its lugs 95 into both of the sets of notches 96 and 97 to thereby lock the pin and box against relative rotation in the fully made-up condition. Screws 100 extend through the annular portion of ring 93 into the pin to retain the ring in its locking position.

Figure 14:
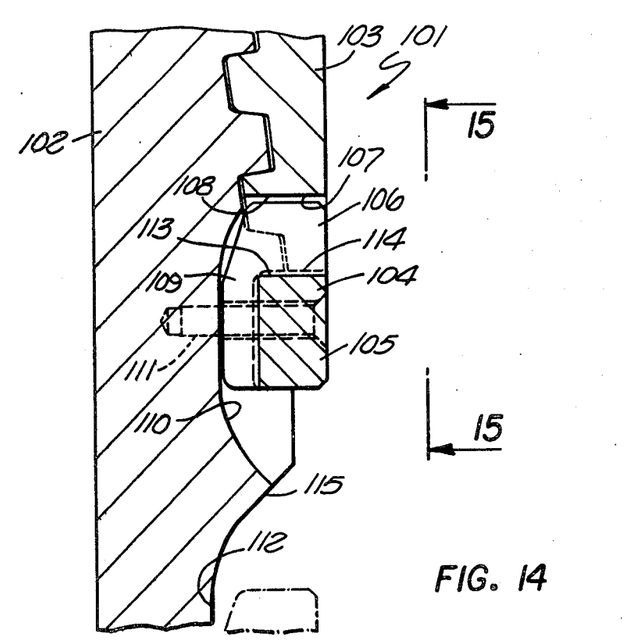
FIG. 14 is a view similar to FIG. 12 but showing another variational arrangement.
Figure 15:
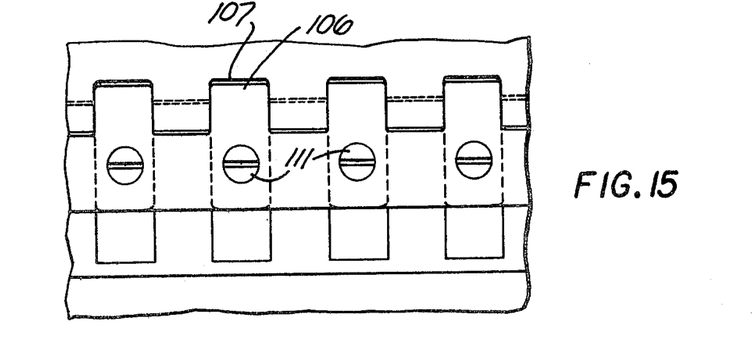
FIG. 15 is a fragmentary elevation taken on line 15—15 of FIG. 14.

FIGS. 14 and 15 show another internally flush type of joint 101, including a pin 102 and box 103 having threads corresponding to those discussed in connection with the first form of the invention, and having a locking ring 104 formed as a radially expansible split ring tending to normally constrict to the reduced diameter condition illustrated in broken lines in FIG. 14. The main body 105 has a cross section corresponding to the hatched area in FIG. 14, and carries a series of circularly spaced lugs 106 which in the full line locking position of FIG. 14 have their upper portions 107 received within circularly spaced locking notches 108 formed in the lower end of pin 103, and have their inner portions 109 received within circularly spaced notches 110 formed in the pin. Screws 111 extend through the locking ring and into the pin to hold the ring in its active position.

In using the device of FIG. 14 and 15, the parts are first threadedly connected together with ring 104 in its retracted broken line position about outer surface 112 of the pin. Attainment of a desired predetermined fully made-up condition is indicated by alignment of shoulders 113 and 114 on the pin and box with one another. When this position is attained, the ring may be forced upwardly from its broken line position of tight resilient engagement with surface 112, being cammed to an increased diameter by engagement with flaring surface 115 on the pin, and then moving upwardly to the full line position of FIG. 14 in which lugs 102 are received within the mating notches in the pin and box section to retain them against relative rotation. Screws 111 are then connected to the ring and pin to secure the ring against movement fom its locking condition. If it is desired to detach the box from the pin, screws 111 can be removed, and ring 104 can then be moved downwardly by first expanding it and then contracting it again upon approaching the broken line retracted position of FIG. 14.

While certain specific embodiments of the present invention have been disclosed as typical, the invention is of course not limited to these particular forms, but rather is applicable broadly to all such variations as fall within the scope of the appended claims.

I claim:

1. A driveable pipe connection comprising:
    first and second sections having interengageable internal and external threads;
    said threads being tapered to progressively decrease in diameter as they advance axially at an angle between about 6 and 9 degrees with respect to the axis of said threads;
    each of said threads having opposite side faces which converge slightly toward one another as they advance from the root of the thread toward its crest;
    said two faces at opposite sides of each thread being disposed at an angle to a line perpendicular to and intersecting the axis of said threads, which angle is not over about 5.5 degrees;
    each of said threads having crest and root surfaces which taper essentially conically between said opposite side faces of the thread and which are received opposite corresponding root and crest surfaces respectively of the other thread, said crest surface of each thread, as viewed in axial section, having a length greater than the height of the thread from its root to its crest surface taken perpendicular to the pitch line;
    a first of said threads as viewed in axial section having a corner at the juncture of its crest surface and one of said opposite side faces which is more abrupt than an engaging corner formed on the second thread at the juncture of its root surface and one of said opposite side faces in a relation causing interference between said corners and requiring slight deformation of one of the corners when engaged to assist in locking the threads in connected relation;
    each thread as viewed in axial section having one of said opposite side faces disposed at an angle to a line perpendicular to said crest surface which is at least about three times as great as the angle of the other side face of the same thread with respect to a line perpendicular to said crest surface;
    all axial driving and rebounding forces between the sections in the fully made-up condition of the connection being taken entirely by said engaging threads, with no additional engagement between shoulders on the two sections to limit the extent to which the threads are connected together.

2. A driveable pipe connection as recited in claim 1, in which said second thread as viewed in axial section also has a corner at the juncture of its crest surface and one of said opposite side faces thereof which is more abrupt than an engaging corner of said first thread at the juncture of its root surface and one of said opposite side faces thereof in a relation causing additional interference between the threads.

3. A driveable pipe connection as recited in claim 1, in which said angle between each of said side faces and a line perpendicular to said axes is between about 4.5 and 5.5 degrees.

4. A driveable pipe connection as recited in claim 1, in which each of said threads at its pitch line has a thickness between said opposite side faces which is at least about one and one-half times as great as the height of the thread from its root to its crest taken perpendicular to the pitch line.

5. A driveable pipe connection as recited in claim 1, in which the tangent of said angle between each of said side faces and a line perpendicular to and intersecting the axis of said threads is less than the coefficient of friction between the engaging thread faces of said two sections.

6. A driveable pipe connection as recited in claim 1, in which said pin and box sections are formed of steel, and said threads are coated with a material having a coefficient of friction lower than the steel of the sections.

7. A driveable pipe connection as recited in claim 1, in which the tangent of the helix angle of said threads is less than the coefficient of friction of the engaging side faces faces of the threads.

8. A driveable pipe connection as recited in claim 1, in which the helix angle of said threads is not over about one degree.

9. A driveable pipe connection as recited in claim 1, including means for releasably locking said sections against relative unscrewing rotation.

10. A driveable pipe connection as recited in claim 1, in which each of said sections contains a series of circularly spaced notches, there being a locking ring carried about one of said sections and having lugs which in a locking position of the ring are received within said notches of both of said sections in a relation locking them against relative rotation, said locking ring being movable from said locking position to a retracted position of disposition about said one section at a location in which the ring does not prevent relative rotation of the sections.

11. A driveable pipe connection as recited in claim 1, in which said first and second sections have indicator portions which are movable into a predetermined relationship perceptible to an operator in a fully made-up condition of the connection, said sections being free of any shoulders other than said threads engageable to limit relative rotation of the sections at said fully made-up condition.

12. A driveable pipe connection as recited in claim 1, in which said two sections have axially facing shoulders which are movable into alignment with one another generally transversely of said axis in a predetermined fully made-up condition of the connection.

13. A driveable pipe connections as recited in claim 1, in which said sections have shoulders facing in opposite axial directions and toward one another and which are received in a predetermined spaced relationship in a fully made-up condition of the connection defining a gap axially therebetween, there being a gauge element receivable between said shoulders and dimensioned to fit closely within said gap when the shoulders are in said predetermined spaced relation to indicate arrival at said fully made-up condition.

* * * * *